(12) United States Patent
Chen et al.

(10) Patent No.: US 7,495,935 B2
(45) Date of Patent: Feb. 24, 2009

(54) DC/AC POWER CONVERTER AND CONTROLLING METHOD THEREOF

(75) Inventors: Lin Chen, Shanghai (CN); Zhiqiang Jiang, Shanghai (CN); Jianping Ying, Shanghai (CN)

(73) Assignee: Delta Electronics, Inc., Taoyuan Hsien (TW)

( * ) Notice: Subject to any disclaimer, the term of this patent is extended or adjusted under 35 U.S.C. 154(b) by 338 days.

(21) Appl. No.: 11/439,752

(22) Filed: May 24, 2006

(65) Prior Publication Data

US 2007/0008750 A1   Jan. 11, 2007

(30) Foreign Application Priority Data

Jul. 7, 2005    (TW) ............................... 94123076 A

(51) Int. Cl.
*H02M 3/335* (2006.01)

(52) U.S. Cl. .................................................. 363/21.12

(58) Field of Classification Search .... 363/21.12–21.18
See application file for complete search history.

(56) References Cited

U.S. PATENT DOCUMENTS

| | | | | |
|---|---|---|---|---|
| 4,628,428 A | * | 12/1986 | Walker | 363/21.16 |
| 6,191,960 B1 | * | 2/2001 | Fraidlin et al. | 363/25 |
| 6,813,166 B1 | * | 11/2004 | Chang et al. | 363/21.14 |
| 7,301,786 B2 | * | 11/2007 | Noguchi et al. | 363/21.03 |

* cited by examiner

*Primary Examiner*—Shawn Riley
(74) *Attorney, Agent, or Firm*—Volpe and Koenig PC

(57) ABSTRACT

The proposed DC/AC power converter for transforming a DC input source to an AC output source includes a transformer having a primary and a secondary windings, a switch network having a first switch electrically connected between the DC input source and the primary winding, a two-way current-transmitting module electrically connected between the secondary winding and the AC output source and a controllable conducting circuit electrically connected to the secondary winding. In which, the controllable conducting circuit is conducting when the two-way current-transmitting module transmits an electrical energy from the primary winding to the secondary winding and a current flowing through the primary winding is decreasing so as to lower down a voltage stress of the first switch of the switch network.

19 Claims, 11 Drawing Sheets

DC/AC POWER CONVERTER AND CONTROLLING METHOD THEREOF

FIELD OF THE INVENTION

The present invention relates to a DC/AC power converter for transforming a DC input source to an AC output source and its controlling method. More specifically, this invention relates to a DC/AC power converter employing switch elements such as MOSFETs and IGBTs and its controlling method.

BACKGROUND OF THE INVENTION

Please refer to FIGS. 1(a) and 1(b), which are the block diagrams of two conventional DC/AC power converters in the prior art respectively.

In FIG. 1(a), the DC/AC power converter 10 includes a SPWM Inverter 101, a Line-Frequency Transformer 102, and a LC Filter 103. Since the Line-Frequency Transformer 102 is employed in transforming a DC input source to an AC output source, the manufacturing cost of this alternative is relatively quite high, and the volume of the DC/AC power converter 10 is relatively bulky.

In FIG. 1(b), the DC/AC power converter 11 includes a High-Frequency Inverter 111, a High-Frequency Transformer 112, a Cycloconverter 113 and a LC Filter 114. Since the High-Frequency Transformer 112 and the Cycloconverter 113 are employed in transforming a DC input source to an AC output source, relatively the manufacturing cost and the weight of the DC/AC power converter 11 of FIG. 1(b) are lower and lighter than those of the DC/AC power converter 10 of FIG. 1(a) respectively. However, the drawbacks of the DC/AC power converter 11 of FIG. 1(b) are that the control circuit thereof is relatively complex and its operational efficiency is relatively low.

Please refer to FIG. 2, it shows the schematic circuit diagram of the conventional current-controlled current source inverter in the prior art. In which, the inverter includes a battery Vin, a transformer Tr, a capacitor C, a load R and five semiconductor switch elements S0-S4.

In which, the semiconductor switch element S0 is located on the primary side of the transformer Tr and is working under the SPWM mode, and the energy in the battery Vin can be transmitted to the load R when the semiconductor switch element S0 is switching.

In FIG. 2, the transformer Tr is a High-Frequency transformer, and has the capability of transmitting the energy. Among the four semiconductor switch elements located on the secondary side of the transformer Tr, S1 to S4, semiconductor switch elements S1 and S3 are working under the working frequency and are switching according to the polarities of the output voltage, and the semiconductor switch elements S2 and S4 are working under the high-frequency while the energy in the load is feedbacked to the battery Vin. The switching of the four semiconductor switch elements, S1 to S4, makes the inverter 20 have the function of two-way energy transmitting.

Relatively, the circuit topology of the inverter 20 has the simpler controlling method, the smaller volume and the lower manufacturing cost, and it would have a relatively better development view in the applications of lower power though. However, the system model of FIG. 2 belongs to buck-boost type circuit topology basically. And the main drawbacks of the inverter 20 are that there are problems regarding the dynamic responses of the whole system are not good when the transformer Tr is working under the CCM mode so as to decrease the voltage stress of the semiconductor switch element S0 and to increase the working efficiency of the inverter 20. Thus, the conventional current-controlled current source inverter 20 of FIG. 2 could not be perfectly applied to the application occasions where relatively larger powers are required.

Keeping the drawbacks of the prior arts in mind, and employing experiments and research full-heartily and persistently, the applicant finally conceived the DC/AC power converter and the controlling method thereof.

SUMMARY OF THE INVENTION

It is therefore an object of the present invention to propose a DC/AC power converter, which is also a current-controlled current source inverter working under the CCM Mode. Except for the current-controlled current source inverter in the prior art, a controllable conducting circuit is also included in the proposed converter and the controllable conducting circuit of the first preferred embodiment of the present invention includes a semiconductor switch element and a diode. Through the proper controlling of the controllable conducting circuit, the present converter would have relatively better dynamic responses while the proposed converter operates under the CCM Mode, and the voltage stress of the semiconductor switch element on the primary side of the transformer could be decreased also.

According to the first aspect of the present invention, the DC/AC power converter for transforming a DC input source to an AC output source includes a transformer having a primary and a secondary windings, a switch network having a first switch electrically connected between the DC input source and the primary winding, a two-way current-transmitting module electrically connected between the secondary winding and the AC output source and a controllable conducting circuit electrically connected to the secondary winding, in which the controllable conducting circuit is conducting when the two-way current-transmitting module transmits an electrical energy from the primary winding to the secondary winding and a current flowing through the primary winding is decreasing so as to lower down a voltage stress of the first switch of the switch network.

Preferably, the switch network is one of a flyback circuit and a dual flyback circuit.

Preferably, the secondary winding of the transformer includes a first winding having a first and a second terminals and a second winding having a first and a second terminals, the two-way current-transmitting module includes a second switch, a third switch, a fourth switch, a fifth switch, a capacitor and a resistor, the second switch is electrically connected to the third switch in series at a first node, the second switch is electrically connected to the first terminal of the first winding, the third switch is electrically connected to the first terminal of the second winding, the fourth switch is electrically connected to the fifth switch in series at a second node, the fourth switch is electrically connected to the second terminal of the second winding, the fifth switch is electrically connected to the second terminal of the first winding, the capacitor is electrically connected to the resistor in parallel, both the capacitor and the resistor are electrically connected to the first node and the second node, and the controllable conducting circuit is electrically connected to the first and the second terminals of the first winding in parallel.

Preferably, the transformer has a discharging time with a fixed value and a dynamic response of the AC output source versus the DC input source is a direct proportion of a conducting time of the first switch.

Preferably, the controllable conducting circuit includes a monostable circuit having a diode and a sixth switch electrically connected to each other in series, the diode and the sixth switch are conducting simultaneously to make the two-way current-transmitting module short-circuit so as to decrease the voltage stress of the first switch when the voltage stress of the first switch equals to a voltage of the DC input source.

Preferably, each of the first to the sixth switches is one of a MOSFET and an IGBT.

Preferably, the switch network is one selected from a group consisting of a full-bridge circuit, a half-bridge circuit and a push-pull circuit.

Preferably, the secondary winding of the transformer includes a winding having a first and a second terminals, the two-way current-transmitting module includes a second switch, a third switch, a capacitor and a resistor, the capacitor is electrically connected to the resistor in parallel, both the capacitor and the resistor are electrically connected between the second switch and the third switch in series, the second and the third switches are electrically connected to the first and the second terminals of the winding respectively, and the controllable conducting circuit is electrically connected to the first and the second terminals of the winding in parallel.

Preferably, the controllable conducting circuit includes two monostable circuits electrically connected to each other in reverse parallel, and each of the two monostable circuits includes a diode and a fourth switch electrically connected to each other in series.

Preferably, the controllable conducting circuit includes a fourth switch and a fifth switch electrically connected to each other in reverse series.

Preferably, the controllable conducting circuit is electrically connected between the secondary winding and the two-way current-transmitting module.

Preferably, the AC output source operates at a line-frequency.

According to the second aspect of the present invention, the method for controlling a DC/AC power converter, in which the converter includes a transformer having a primary and a secondary windings, a switch network having a first switch electrically connected between a DC input source and the primary winding, a two-way current-transmitting module electrically connected between the secondary winding and an AC output source and a controllable conducting circuit electrically connected to the secondary winding, includes the steps of: (a) transmitting an electrical energy from the primary winding to the secondary winding by the two-way current-transmitting module such that the controllable conducting circuit is conducting when a current flowing through the primary winding is decreasing so as to lower down a voltage stress of the first switch of the switch network; and (b) fixing a discharging time of the transformer such that a dynamic response of the AC output source versus the DC input source is a direct proportion of a conducting time of the first switch.

Preferably, the controllable conducting circuit includes a monostable circuit having a diode and a second switch electrically connected to each other in series.

Preferably, the step (a) further includes a step of: (a1) transmitting the electrical energy from the primary winding to the secondary winding by the two-way current-transmitting module such that the diode and the second switch are conducting simultaneously to make the two-way current-transmitting module short-circuit so as to decrease the voltage stress of the first switch when the voltage stress of the first switch equals to a voltage of the DC input source.

Preferably, the controllable conducting circuit includes two monostable circuits electrically connected to each other in reverse parallel, and each of the two monostable circuits includes a diode and a second switch electrically connected to each other in series.

Preferably, the step (a) further includes a step of: (a1) transmitting the electrical energy from the primary winding to the secondary winding by the two-way current-transmitting module such that one of the two monostable circuits is conducting to make the two-way current-transmitting module short-circuit so as to decrease the voltage stress of the first switch when the voltage stress of the first switch equals to a voltage of the DC input source.

Preferably, the controllable conducting circuit includes a second switch and a third switch electrically connected to each other in reverse series.

Preferably, the step (a) further includes a step of: (a1) transmitting the electrical energy from the primary winding to the secondary winding by the two-way current-transmitting module such that one of the second and the third switches is conducting to make the two-way current-transmitting module short-circuit so as to decrease the voltage stress of the first switch when the voltage stress of the first switch equals to a voltage of the DC input source.

The present invention may best be understood through the following descriptions with reference to the accompanying drawings, in which:

DETAILED DESCRIPTION OF THE PREFERRED EMBODIMENT

Figure 3:
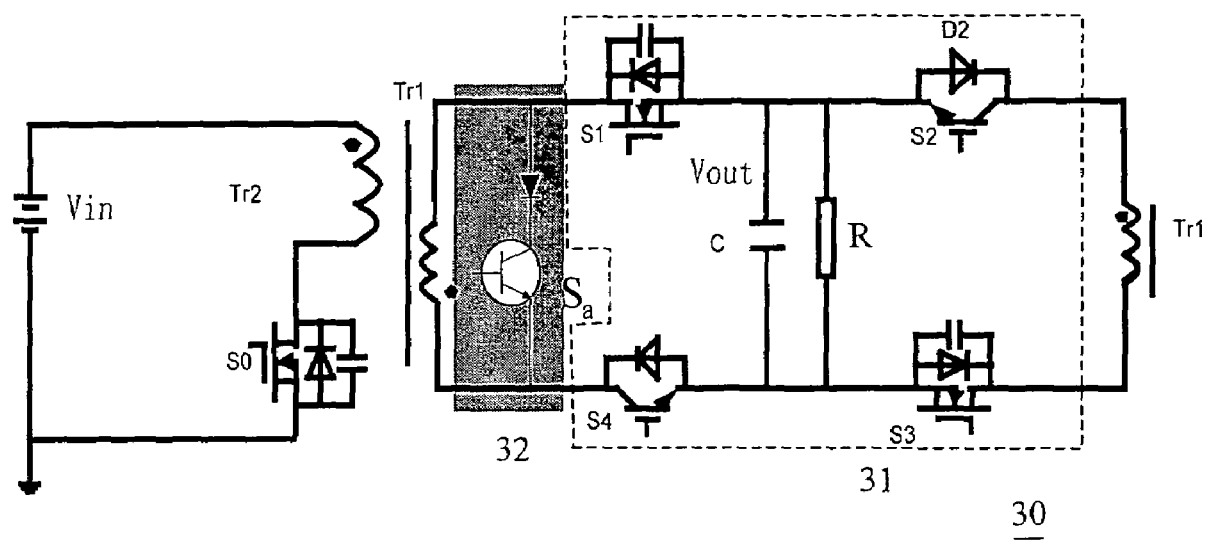
FIG. 3 is the schematic circuit diagram of the first preferred embodiment of the DC/AC power converter of the present invention.

Please refer to FIG. 3, it shows the schematic circuit diagram of the first preferred embodiment of the DC/AC power converter of the present invention. In which, the proposed DC/AC power converter 30 includes a transformer Tr, a two-way current transmitting module 31 and a controllable conducting circuit 32. The main function of the DC/AC power converter 30 is to transform a DC input source Vin to an AC output source Vout.

The primary side of the transformer Tr is electrically connected to a switch network including a first switch S0 in series, both the primary side of the transformer Tr and the switch network are electrically connected to the DC input source Vin in parallel, and the two-way current transmitting module 31 and the controllable conducting circuit 32 are coupled between the two windings of the secondary side of the transformer Tr.

The two-way current transmitting module 31 includes the second switch S1, the third switch S2, the fourth switch S3, the fifth switch S4, a capacitor C and a resistor R (the load). The secondary winding Tr1 of the transformer Tr includes a first winding having a first and a second terminals and a second winding having a first and a second terminals, the second switch S1 is electrically connected to the third switch S2 in series at a first node, the second switch S1 is electrically connected to the first terminal of the first winding of Tr1, the third switch S2 is electrically connected to the first terminal of the second winding of Tr1, the fourth switch S3 is electrically connected to the fifth switch S4 in series at a second node, the fourth switch S3 is electrically connected to the second terminal of the second winding of Tr1, the fifth switch S4 is electrically connected to the second terminal of the first winding of Tr1, the capacitor C is electrically connected to the resistor R in parallel, both the capacitor C and the resistor R are electrically connected to the first node and the second node, and the controllable conducting circuit 32 is electrically connected to the first and the second terminals of the first winding of Tr1 in parallel.

In the first preferred embodiment of the present invention 30, the controllable conducting circuit 32 is a monostable circuit, which includes a diode Da and a sixth switch Sa, but the controllable conducting circuit 32, as the unique technological feature of the present invention, is not limited to that, and any controllable element that is monostable would be applicable. Besides, different kinds/types of the MOSFETs and IGBTs are applicable in the first preferred embodiment of the present invention depending on various application occasions.

The main circuit configuration of the present invention is described as aforementioned. The operational principles of the present DC/AC power converter are described as follows.

Figure 4A:
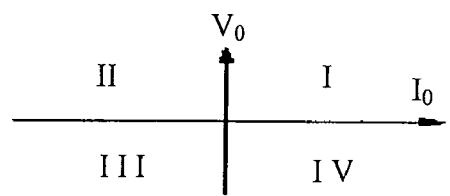
FIGS. 4(a) to 4(c) are the quadrantal diagrams showing the value ranges of the load voltage and the load current in the four phases while the DC/AC power converter with the two-way current transmitting function of the present invention is working and the waveforms of the load voltage and the load current while the DC/AC power converter with the two-way current transmitting function of the present invention is working under the Inverter Mode and the Charger Mode respectively.
Figure 4B:
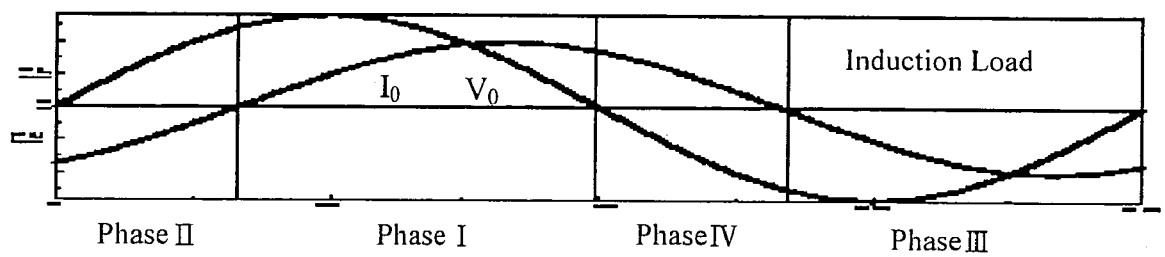
Figure 4C:
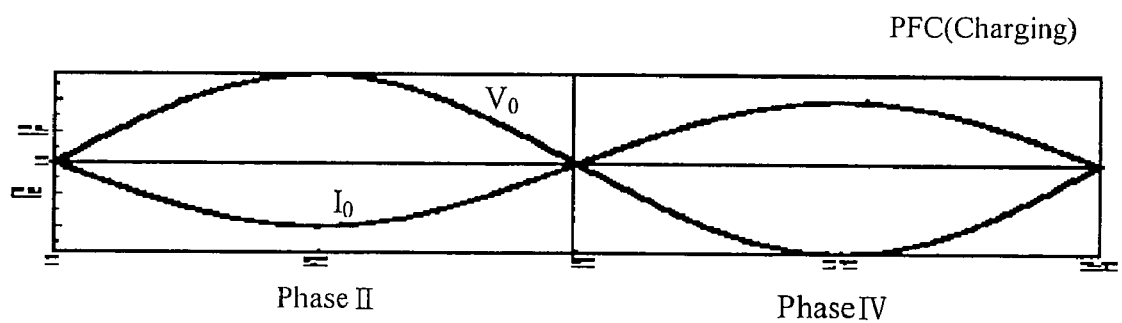

Please refer to FIG. 4(a), which is the quadrantal diagram showing the value ranges of the load voltage and the load current in the four phases while the DC/AC power converter with the two-way current transmitting function of the present invention is working. In which, Vo is the output voltage over the load (Vout), and Io is the output current through the load (Iout). FIGS. 4(b) and 4(c) are the quadrantal diagrams showing the waveforms of the load voltage and the load current while the DC/AC power converter with the two-way current transmitting function of the present invention is working under the Inverter Mode and the Charger Mode respectively.

Figure 5:
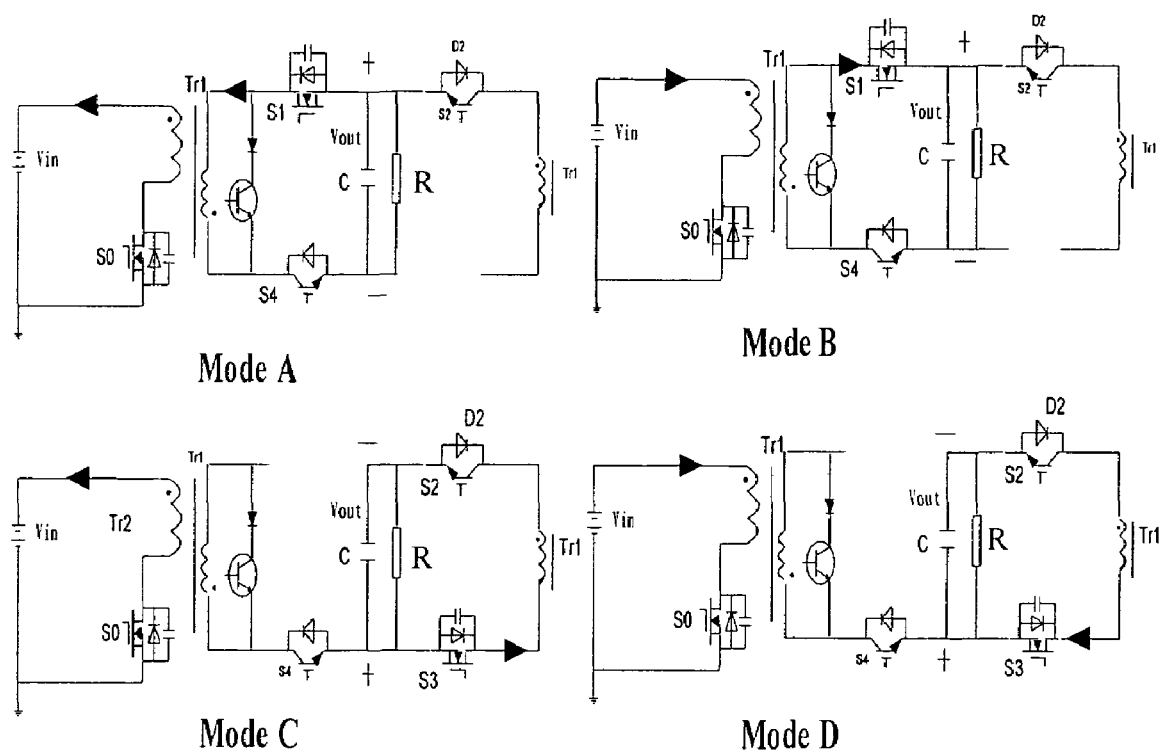
FIG. 5 shows the equivalent circuit diagrams of the first preferred embodiment of the DC/AC power converter of the present invention under the inverter mode and the charger mode respectively.

In FIG. 5, it shows the equivalent circuit diagrams of the first preferred embodiment of the DC/AC power converter of the present invention 30 under the inverter mode and the charger mode respectively. In which, Mode A and Mode C are the equivalent circuit diagrams of the first preferred embodiment of the DC/AC power converter of the present invention 30 under the energy-feedback mode and Mode B and Mode D are the equivalent circuit diagrams of the first preferred embodiment of the DC/AC power converter of the present invention 30 under the energy-transmitting mode. Which are further elaborated according to FIG. 5 as follows.

(a) The energy-feedback mode (two-way current-transmitting module 31 feedbacks the electrical energy from the secondary side of the transformer, Tr, to the primary side of Tr)

(a1) When Vout>0 and Iout<0, the fifth switch S4 is working in the high-frequency mode, the second switch S1 is turned on for a relatively long period, and the first switch S0 and the fourth switch S3 are both turned off as shown in Mode A. The DC/AC power converter of the present invention 30 is employed as a flyback converter when the electrical energy is feedbacked.

(a2) When Vout<0 and Iout>0, the third switch S2 is working in the high-frequency mode, the fourth switch S3 is turned on for a relatively long period, and the first switch S0 and the second switch S1 are both turned off as shown in Mode C. The DC/AC power converter of the present invention 30 feedbacks the extra electrical energy to the primary side of Tr.

(b) The energy-transmitting mode (two-way current-transmitting module 31 transmits the electrical energy from the primary side of Tr to the secondary side of Tr)

(b1) When Vout>0 and Iout>0, the first switch S0 is working in the high-frequency mode, the second switch S1 is turned on for a relatively long period, the fourth switch S3 and the fifth switch S4 are both turned off, and the output current will flow through the body diode of the fifth switch S4 as shown in Mode B. The DC/AC power converter of the present invention 30 is still employed as a flyback converter when the electrical energy is transmitted.

(b2) When Vout<0 and Iout<0, the first switch S0 is working in the high-frequency mode, the second switch S1 is turned off, the fourth switch S3 is turned on for a relatively long period, the third switch S2 is turned off and the output current will flow through the body diode of the third switch S2 as shown in Mode D.

The above-mentioned descriptions are employed to elaborate the circuit topology of the DC/AC power converter of the present invention 30 of FIG. 3 working under the energy-feedback mode and the energy-transmitting mode. The operational principles of the first preferred embodiment of the proposed DC/AC power converter 30 of the present invention as shown in FIG. 3 are described as follows.

Figure 6A:
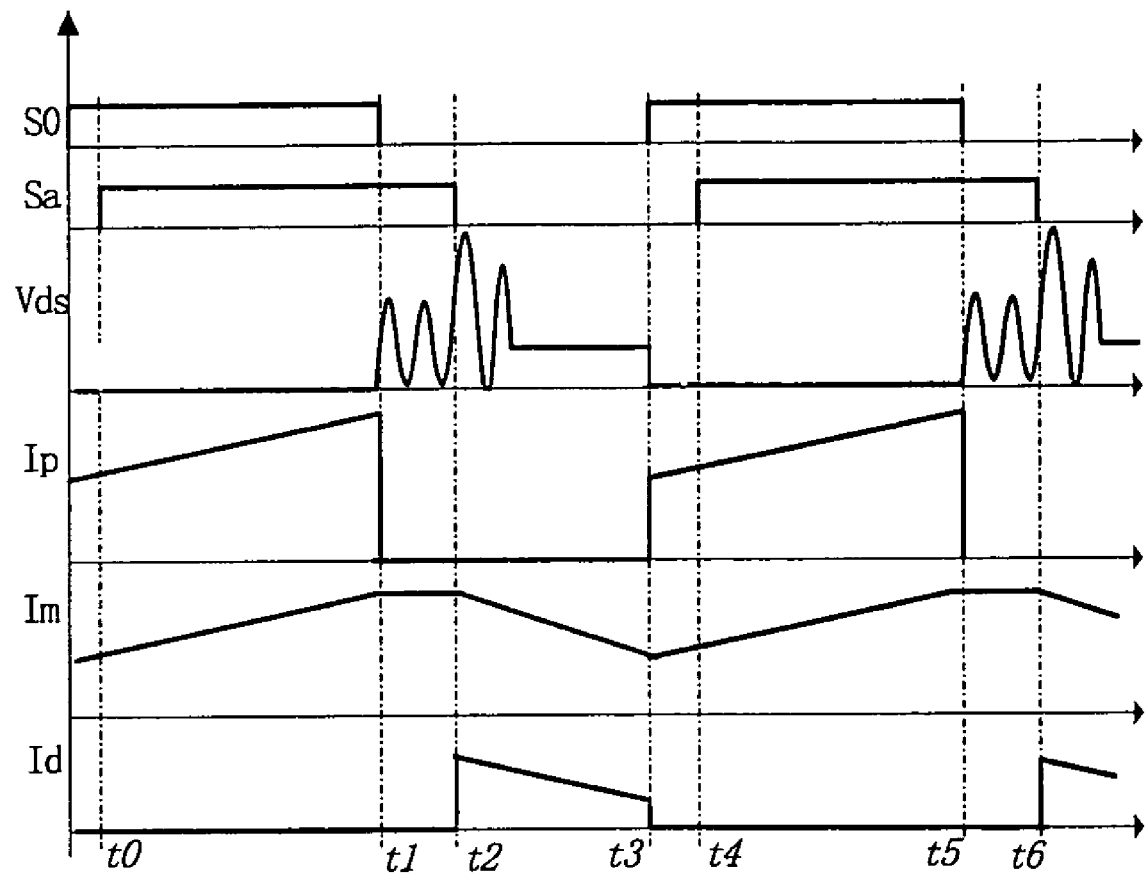
FIG. 6(a) shows the waveforms of the driving signals of the first switch So and the sixth switch Sa, the voltage stress of the first switch So (Vds), the peak value of the current through the primary winding of the transformer (Ip), the exciting current of the transformer (Im) and the instantaneous current through the secondary winding of the transformer (Id) versus time of the first preferred embodiment of the present invention respectively.
Figure 6B:
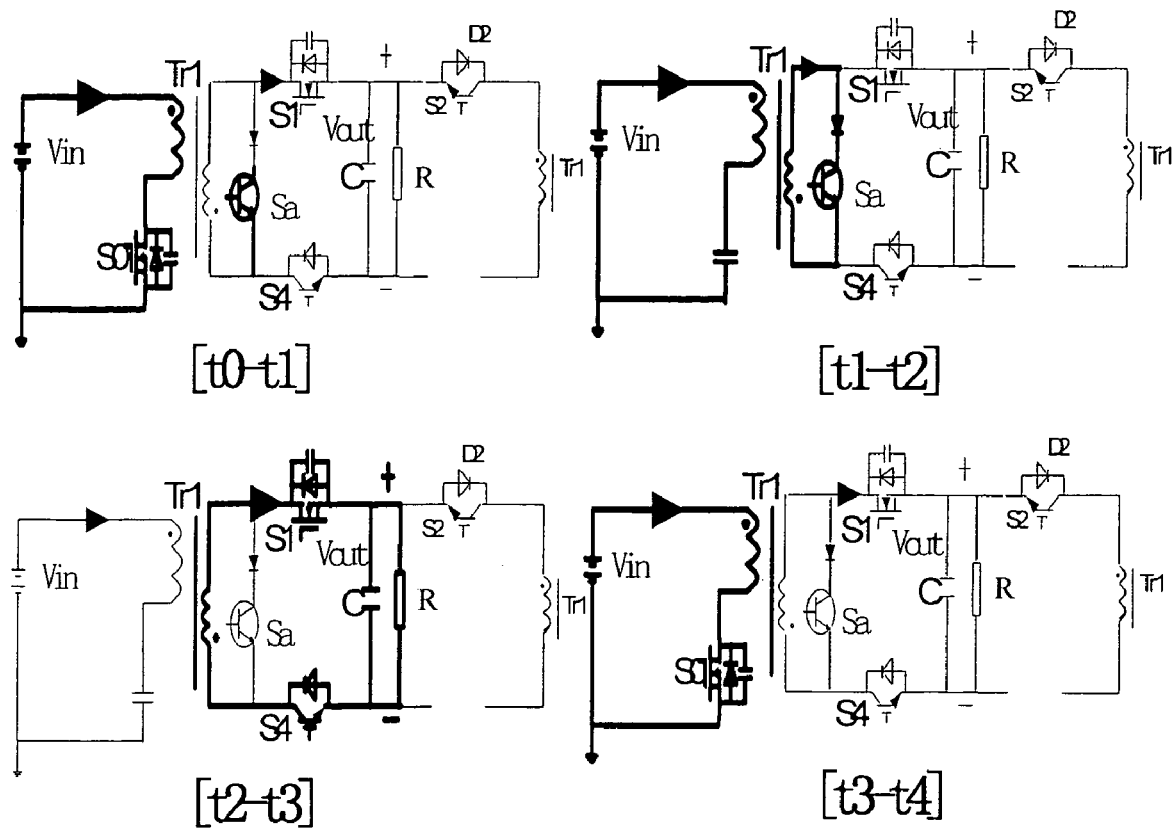
FIG. 6(b) shows the equivalent circuit diagrams of the first preferred embodiment of the DC/AC power converter of the present invention, which are shown sequentially according to the time intervals of FIG. 6(a) respectively.

In FIG. 6(a), which shows the waveforms of the driving signals of the first switch So and the sixth switch Sa, the voltage stress of the first switch So (Vds), the peak value of the current through the primary winding of the transformer (Ip), the exciting current of the transformer (Im) and the instantaneous current through the secondary winding of the transformer (Id) versus time of the first preferred embodiment of the present invention respectively. Please refer to FIG. 6(b), it shows the equivalent circuit diagrams of the first preferred embodiment of the DC/AC power converter of the present invention 30, which are shown sequentially according to the time intervals of FIG. 6(a) respectively.

Figure 1A:
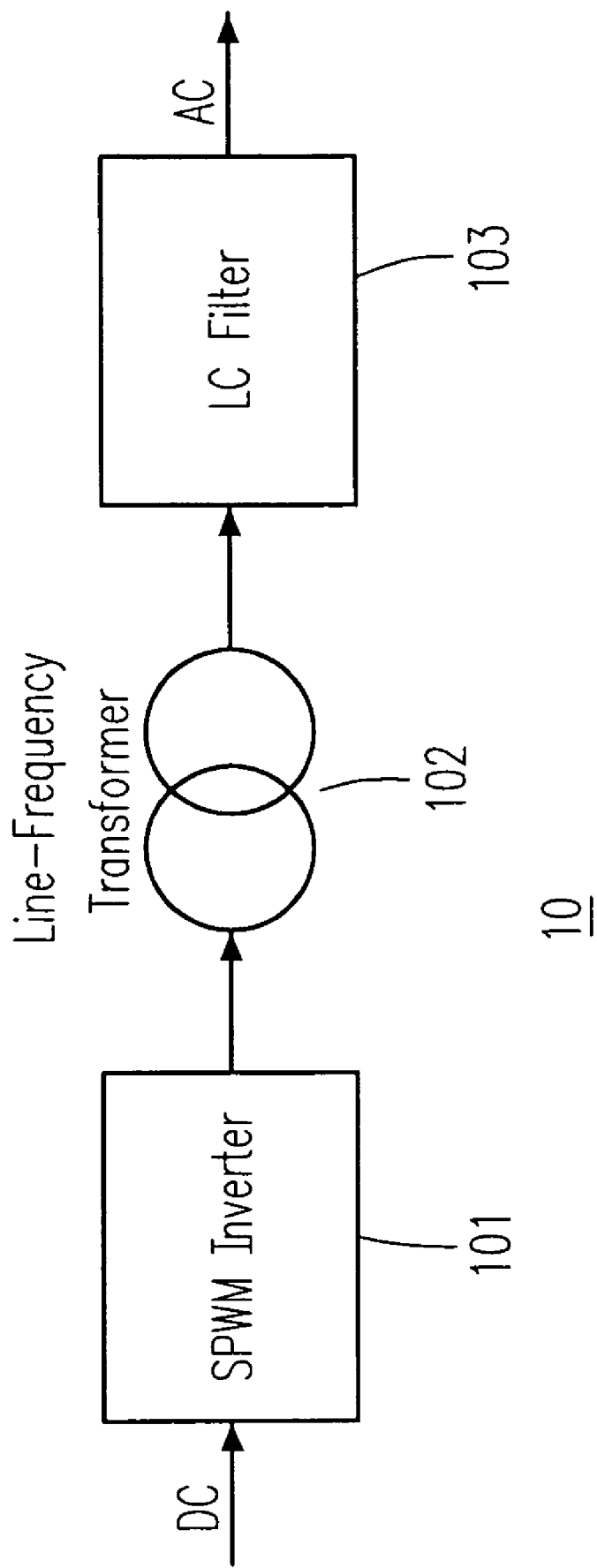
FIGS. 1(a) and 1(b) are the block diagrams of two conventional DC/AC power converters in the prior art respectively.
Figure 1B:
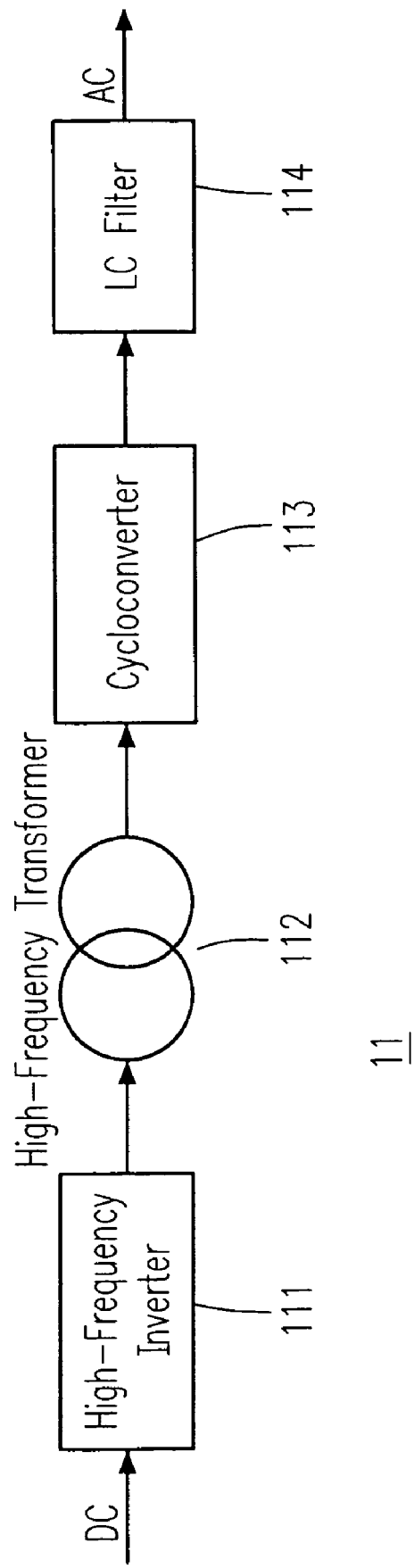
Figure 2:
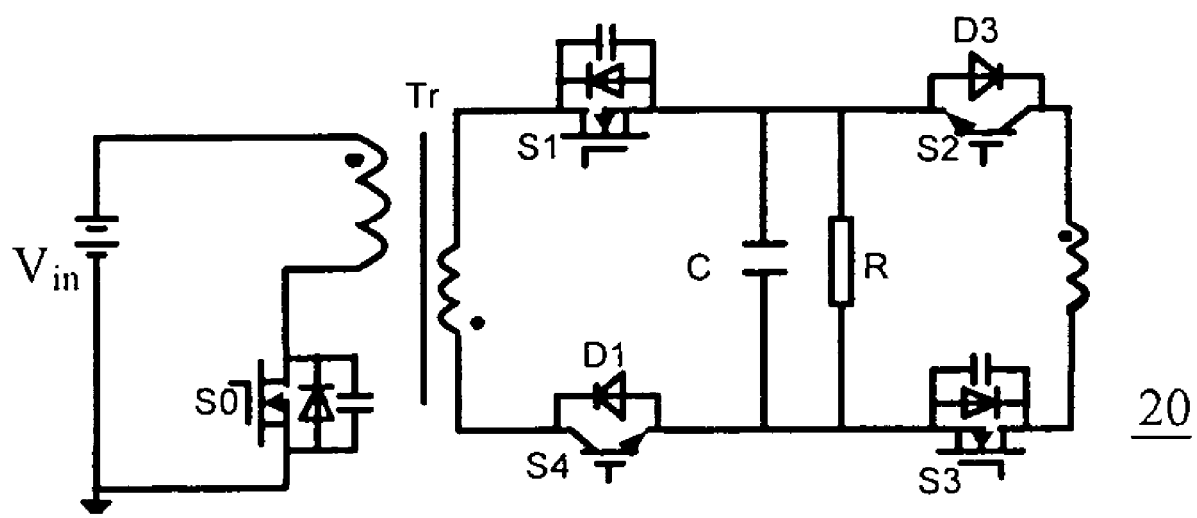
FIG. 2 is the schematic circuit diagram of the conventional current-controlled current source inverter in the prior art.

As aforementioned, the main problems of the inverter 20 in the prior art as shown in FIG. 2 are that the voltage stresses of the semiconductor switch element S0 are relatively quite large and the dynamic responses of S0 are not good. However, the controllable conducting circuit 32 is introduced in the present invention and both these two problems can be solved at the same time. Since the controllable conducting circuit 32 is not involved in the work when the DC/AC power converter 30 operates under the energy-feedback mode, thus only Mode B and Mode D, which are both under the energy-transmitting mode, are analyzed as an example:

(A) Time Interval [t0-t1]:

At the moment t0, the first switch S0 is turned on, and the sixth switch Sa is turned on after a delay time. At that moment, there is no current flowing through the sixth switch Sa since the diode Da electrically connected to the sixth switch Sa in series is under a reverse recovery voltage, and the transformer Tr is employed as an inductor for storing the electrical energy.

(B) Time Interval [t1-t2]:

At the moment t1, the first switch S0 is turned off. Before the voltage stress of the first switch S0 reaches the value of input voltage (Vin), the exciting current on the transformer will increase continuously, and the diode Da is still under a reverse recovery voltage. The diode Da electrically connected to the sixth switch Sa in series is turned on until the voltage stress of the first switch S0 equals to Vin. Since the sixth switch Sa is turned on before the moment t1, the secondary side of the transformer Tr is short-circuited by the controllable conducting circuit 32 having the sixth switch Sa and the diode Da. At that moment, the output voltage of the secondary side of Tr, Vout, is zero, and the energy stored in the leakage inductance of the primary side begins to resonate with the parasite capacitance of the first switch S0.

During this period, the voltage stress of the first switch S0, Vds, can be expressed as follows (see the waveform of Vds in FIG. 6(a)).

Vds=NVout+Vin+Vresonance=Vin+Vresonance. In which, N is the primary/secondary turn ratio.

Since the conventional flyback converter does not have the controllable conducting circuit 32 to clamp the voltage on the first switch S0 of the primary side, the voltage stress on the first switch S0 of the conventional flyback converter is higher than that of the propsed converter by an amount of NVout. This amount will result in a relatively great influence on the voltage stress of the switch on the primary side at the application occasions regarding the high-frequency link of low voltage DC input source (48V in general) and high voltage/low frequency output (e.g., 220V and 50 Hz).

(C) Time Interval [t2-t3]:

At the moment t2, the sixth switch Sa is turned off, and the electrical energy stored in the transformer Tr is transmitted to the load R. Assume that the turn-on time of the first switch S0, (t3-t5), is D and the energy-releasing time of the transformer Tr, (t2-t3), is K, then t1–t2=1–D–K. Thus, the relationship between the output voltage and the input voltage of the conventional flyback converter is: Vout=VinxD/(1–D)

In the circuit of the present invention, the above-mentioned formula would be transformed to Vout=VinxD/K.

If the time is a fixed value (K is fixed) when the energy is released, then the aforementioned formula is: Vout=VinxD.

Figure 7:
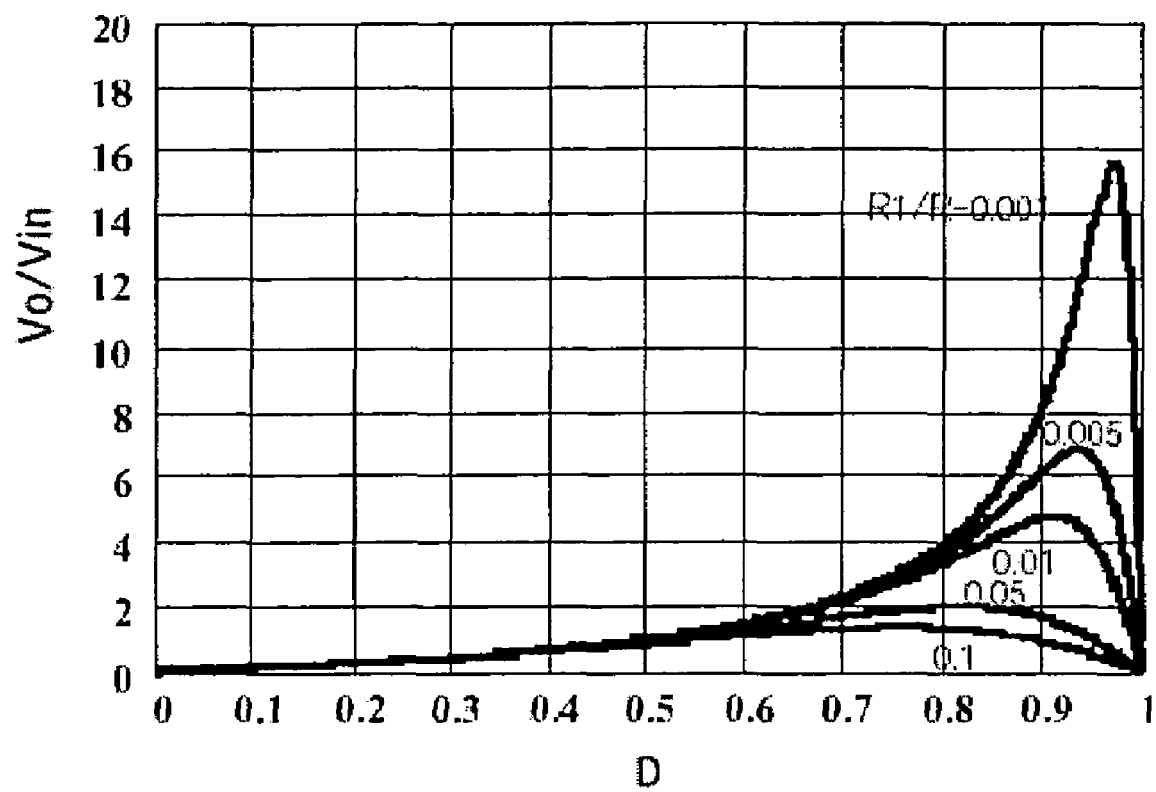
FIG. 7 is the schematic diagram showing that relatively the dynamic responses of the conventional DC/AC power converter in the prior art are not good.

One would know that the dynamic responses of the AC output source Vout versus the DC input source Vin is stably directly proportionate to a conducting time D of the first switch So. Thus, the proposed converter in the present invention could be simplified to a buck topology through the proposed controlling method, there won't be any right-half-plane-zero phenomenon in the quadrantal diagram, and there won't be any of those dynamic responses are not good cases as shown in FIG. 7 also. Therefore, the proposed DC/AC power converter could achieve better dynamic responses even if it is operated in the CCM mode.

(D) Time Interval [t3-t4]

At the moment t3, the first switch S0 is turned on, and the body diode of the fifth switch S4 is under a reverse recovery voltage. The transformer Tr begins to store the electrical energy, and the working mode of the present converter is exactly the same as the conventional flyback converter.

Figure 8:
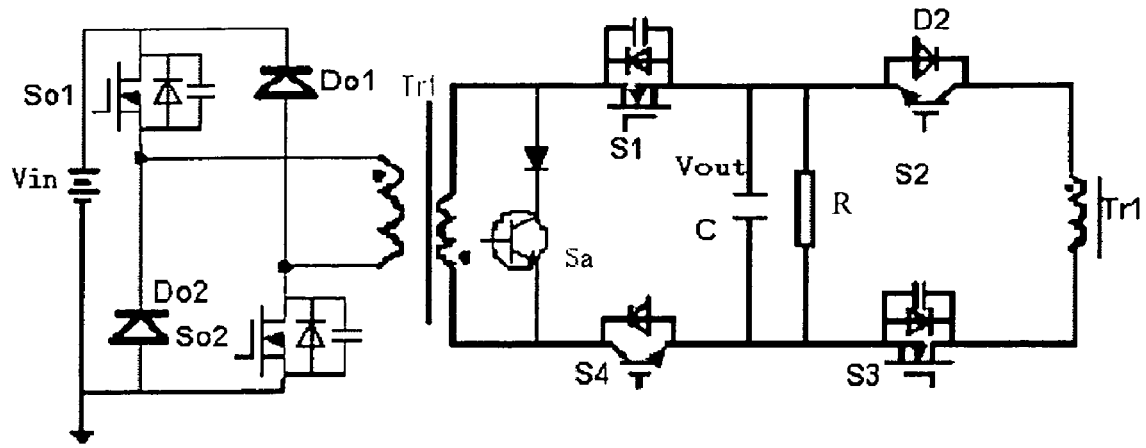
FIG. 8 is the schematic circuit diagram of the second preferred embodiment of the DC/AC power converter of the present invention.

Notice that the switch network electrically connected between the primary side of the transformer Tr and the DC input source Vin of the first preferred embodiment of the DC/AC power converter of the present invention as shown in FIG. 3 is described as the first switch S0 of the flyback circuit for example though, but the switch network could also be replaced by a dual flyback circuit (which is the second preferred embodiment of the DC/AC power converter of the present invention as shown in FIG. 8). Besides, the aforementioned switch network could be replaced by one selected from a group consisting of a full-bridge circuit, a half-bridge circuit and a push-pull circuit too, which are further elaborated as follows.

Figure 9:
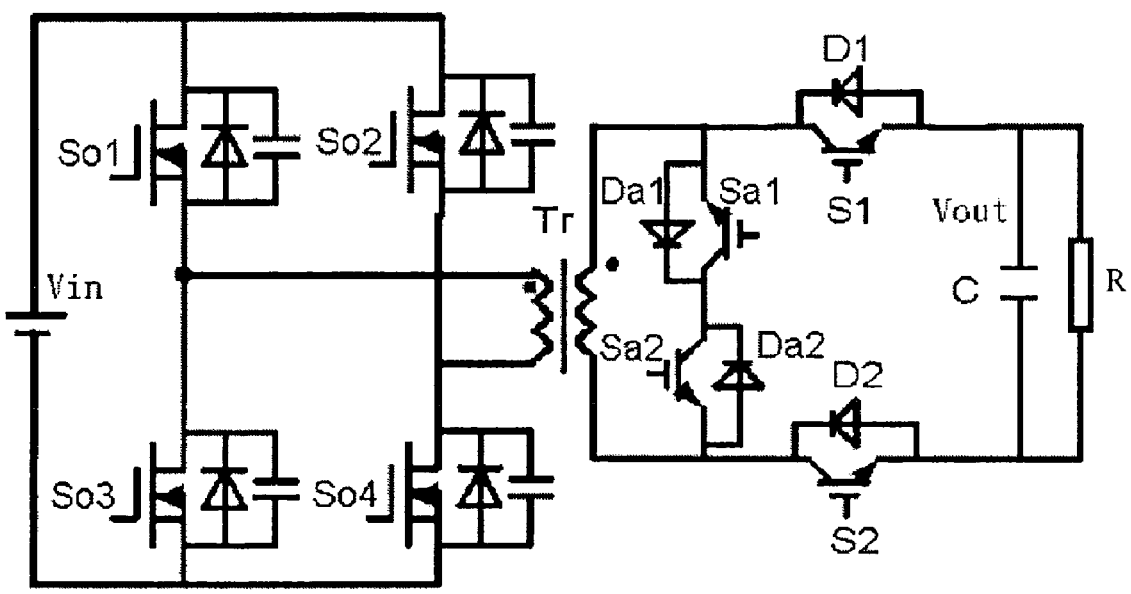
FIG. 9 is the schematic circuit diagram of the third preferred embodiment of the DC/AC power converter of the present invention.

Please refer to FIG. 9, which shows the schematic circuit diagram of the third preferred embodiment of the DC/AC power converter of the present invention. The difference between FIG. 9 and the first preferred embodiment of the DC/AC power converter of the present invention of FIG. 3 is that the switch network electrically connected between the primary side of the transformer Tr and the DC input source Vin of FIG. 3 is replaced by a full-bridge circuit as shown in FIG. 9. In FIG. 9, the full-bridge circuit includes four switches So1, So2, So3 and So4. And notice that the secondary side of the transformer Tr could include a winding only since the switch network of the full-bridge circuit could accomplish the polarity commutation of the input voltage of the primary side of the transformer Tr. Furthermore, the controllable conducting circuit could either include two monostable circuits electrically connected to each other in reverse parallel as shown in FIG. 3, or include the ninth switch Sa1 and the tenth switch Sa2 electrically connected to each other in reverse series as shown in FIG. 9.

Figure 10:
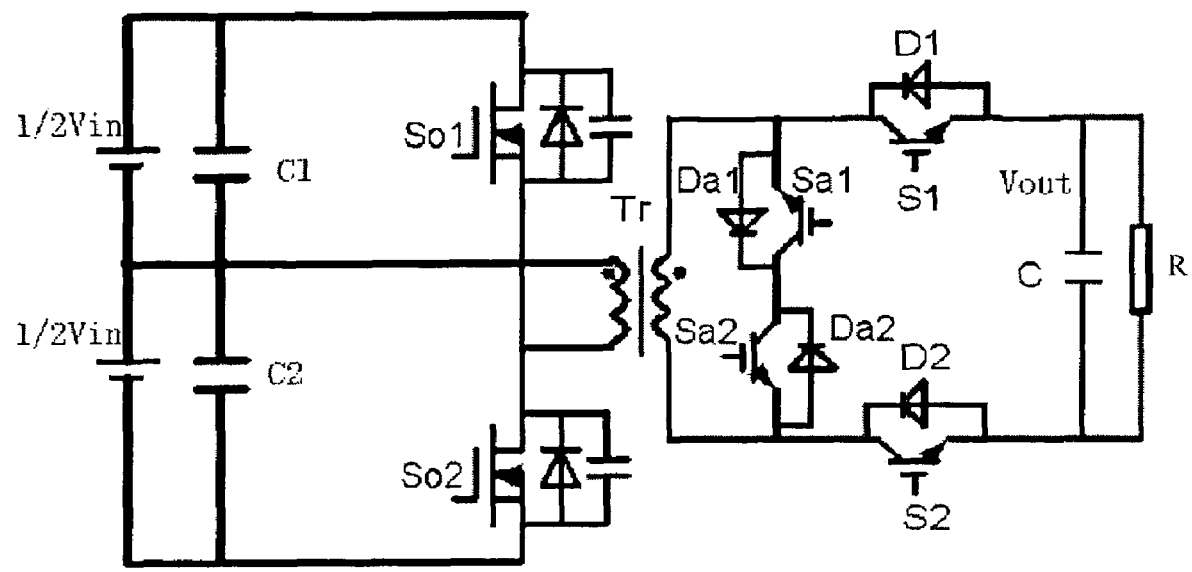
FIG. 10 is the schematic circuit diagram of the fourth preferred embodiment of the DC/AC power converter of the present invention.
Figure 11:
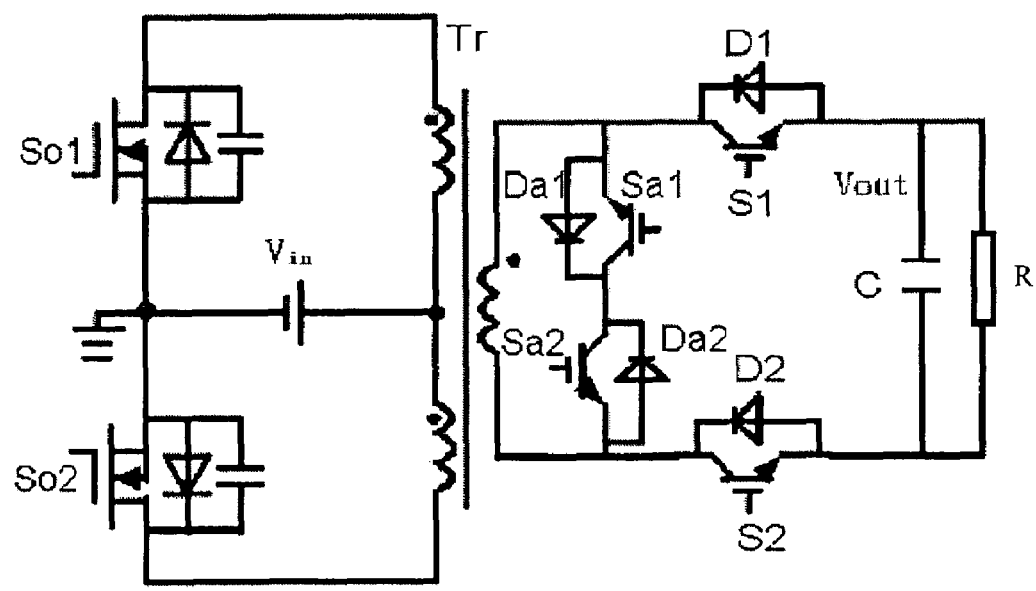
FIG. 11 is the schematic circuit diagram of the fifth preferred embodiment of the DC/AC power converter of the present invention.

FIGS. 10 and 11 are the schematic circuit diagrams of the fourth and fifth preferred embodiments of the DC/AC power converter of the present invention respectively. In which, the switch network electrically connected between the primary side of the transformer Tr and the DC input source Vin as shown in FIG. 3 is replaced by a half-bridge circuit as shown in FIG. 10 and a push-pull circuit as shown in FIG. 11 respectively. The second alternative of the controllable conducting circuit as shown in FIG. 9 could also apply to the fourth and the fifth preferred embodiments of the DC/AC power converter of the present invention.

According to the aforementioned descriptions, the proposed DC/AC power converter is also a current-controlled current source inverter working under the CCM Mode. Except for the current-controlled current source inverter in the prior art, a controllable conducting circuit is also included in the proposed converter and the controllable conducting circuit of the first preferred embodiment of the present invention includes a semiconductor switch element and a diode. Through the proper controlling of the controllable conducting circuit, the present converter would have relatively better dynamic responses while the proposed converter operates under the CCM Mode, and the voltage stress of the semiconductor switch element on the primary side of the transformer could be decreased also. Furthermore, relatively the provided DC/AC power converter of the present invention has the higher power density and the lower manufacturing cost since there is only one stage of conversion between the DC input source and the AC output source. The proposed DC/AC converter could be employed in the various UBSs of AC power sources and the AC emergency power sources.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present invention which is defined by the appended claims.

What is claimed is:

1. A DC/AC power converter for transforming a DC input source to an AC output source, comprising: a transformer having a primary and a secondary windings; a switch network having a first switch electrically connected between said DC input source and said primary winding; a two-way current-transmitting module electrically connected between said secondary winding and said AC output source; and a controllable conducting circuit electrically connected to said secondary winding, wherein said controllable conducting circuit is conducting to cause a short circuit to the secondary winding when said two-way current-transmitting module transmits an electrical energy from said primary winding to said secondary winding and a current flowing through said primary winding is decreasing so as to lower down a voltage stress of said first switch of said switch network.

2. The converter according to claim 1, wherein said switch network is one of a flyback circuit and a dual flyback circuit.

3. The converter according to claim 2, wherein said secondary winding of said transformer comprises a first winding having a first and a second terminals and a second winding having a first and a second terminals, said two-way current-transmitting module comprises a second switch, a third switch, a fourth switch, a fifth switch, a capacitor and a resistor, said second switch is electrically connected to said third switch in series at a first node, said second switch is electrically connected to said first terminal of said first winding, said third switch is electrically connected to said first terminal of said second winding, said fourth switch is electrically connected to said fifth switch in series at a second node, said fourth switch is electrically connected to said second terminal of said second winding, said fifth switch is electrically connected to said second terminal of said first winding, said capacitor is electrically connected to said resistor in parallel, both said capacitor and said resistor are electrically connected to said first node and said second node, and said controllable conducting circuit is electrically connected to said first and said second terminals of said first winding in parallel.

4. The converter according to claim 3, wherein said transformer has a discharging time with a fixed value and a dynamic response of said AC output source versus said DC input source is a direct proportion of a conducting time of said first switch.

5. The converter according to claim 4, wherein said controllable conducting circuit comprises a monostable circuit having a diode and a sixth switch electrically connected to each other in series, said diode and said sixth switch are conducting simultaneously to make said two-way current-transmitting module short-circuit so as to decrease said voltage stress of said first switch when said voltage stress of said first switch equals to a voltage of said DC input source.

6. The converter according to claim 5, wherein each of said first to said sixth switches is one of a MOSFET and an IGBT.

7. The converter according to claim 1, wherein said switch network is one selected from a group consisting of a full-bridge circuit, a half-bridge circuit and a push-pull circuit.

8. The converter according to claim 7, wherein said secondary winding of said transformer comprises a winding having a first and a second terminals, said two-way current-transmitting module comprises a second switch, a third switch, a capacitor and a resistor, said capacitor is electrically connected to said resistor in parallel, both said capacitor and said resistor are electrically connected between said second switch and said third switch in series, said second and said third switches are electrically connected to said first and said second terminals of said winding respectively, and said controllable conducting circuit is electrically connected to said first and said second terminals of said winding in parallel.

9. The converter according to claim 8, wherein said controllable conducting circuit comprises two monostable circuits electrically connected to each other in reverse parallel, and each of said two monostable circuits comprises a diode and a fourth switch electrically connected to each other in series.

10. The converter according to claim 8, wherein said controllable conducting circuit comprises a fourth switch and a fifth switch electrically connected to each other in reverse series.

11. The converter according to claim 1, wherein said controllable conducting circuit is electrically connected between said secondary winding and said two-way current-transmitting module.

12. The converter according to claim 1, wherein said AC output source operates at a line-frequency.

13. A method for controlling a DC/AC power converter, wherein said converter comprises a transformer having a primary and a secondary windings, a switch network having a first switch electrically connected between a DC input source and said primary winding, a two-way current-transmitting module electrically connected between said secondary winding and an AC output source and a controllable conducting circuit electrically connected to said secondary winding, comprising the steps of: (a) transmitting an electrical energy from said primary winding to said secondary winding by said two-way current-transmitting module such that said controllable conducting circuit is conducting to cause a short circuit to the secondary winding when a current flowing through said primary winding is decreasing so as to lower down a voltage stress of said first switch of said switch network; and (b) fixing a discharging time of said transformer such that a dynamic response of said AC output source versus said DC input source is a direct proportion of a conducting time of said first switch.

14. The method according to claim 13, wherein said controllable conducting circuit comprises a monostable circuit having a diode and a second switch electrically connected to each other in series.

15. The method according to claim 14, wherein said step (a) further comprises a step of: (a1) transmitting said electrical energy from said primary winding to said secondary winding by said two-way current-transmitting module such that said diode and said second switch are conducting simultaneously to make said two-way current-transmitting module short-circuit so as to decrease said voltage stress of said first switch when said voltage stress of said first switch equals to a voltage of said DC input source.

16. The method according to claim 13, wherein said controllable conducting circuit comprises two monostable circuits electrically connected to each other in reverse parallel, and each of said two monostable circuits comprises a diode and a second switch electrically connected to each other in series.

17. The method according to claim 16, wherein said step (a) further comprises a step of: (a1) transmitting said electrical energy from said primary winding to said secondary winding by said two-way current-transmitting module such that one of said two monostable circuits is conducting to make said two-way current-transmitting module short-circuit so as to decrease said voltage stress of said first switch when said voltage stress of said first switch equals to a voltage of said DC input source.

18. The method according to claim 13, wherein said controllable conducting circuit comprises a second switch and a third switch electrically connected to each other in reverse series.

19. The method according to claim 18, wherein said step (a) further comprises a step of: (a1) transmitting said electrical energy from said primary winding to said secondary winding by said two-way current-transmitting module such that one of said second and said third switches is conducting to make said two-way current-transmitting module short-circuit so as to decrease said voltage stress of said first switch when said voltage stress of said first switch equals to a voltage of said DC input source.

* * * * *